Aug. 8, 1939.   C. T. WALTER   2,168,693
SAUSAGE LINKER
Filed Feb. 10, 1937   2 Sheets-Sheet 1
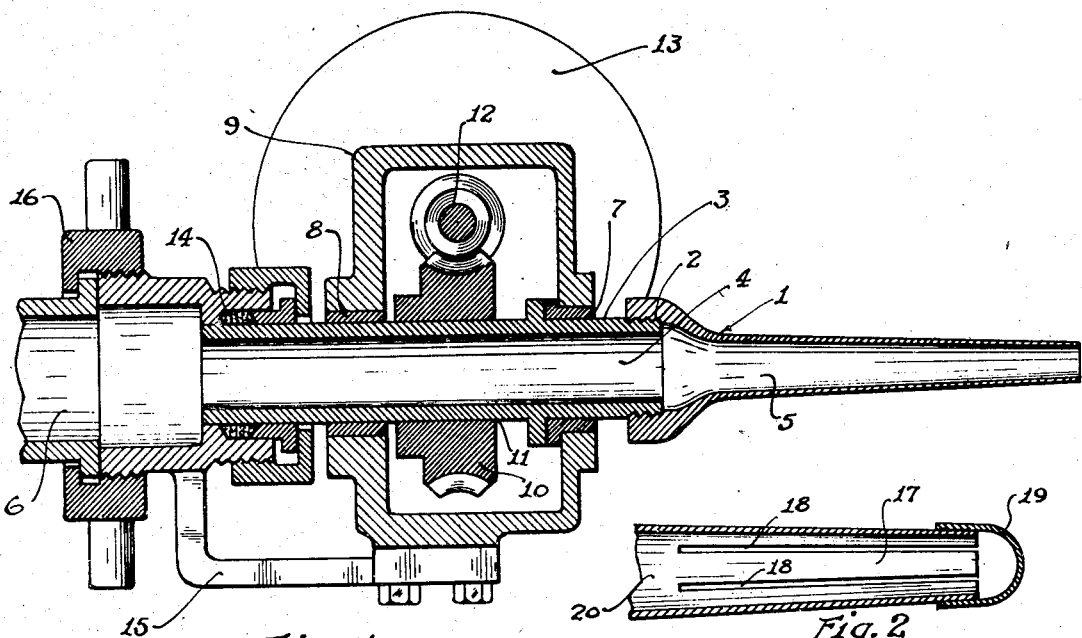
Fig.1
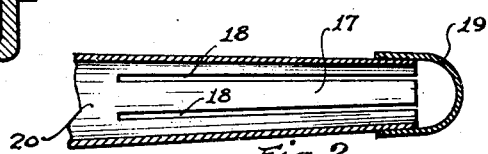
Fig.2
Fig.3
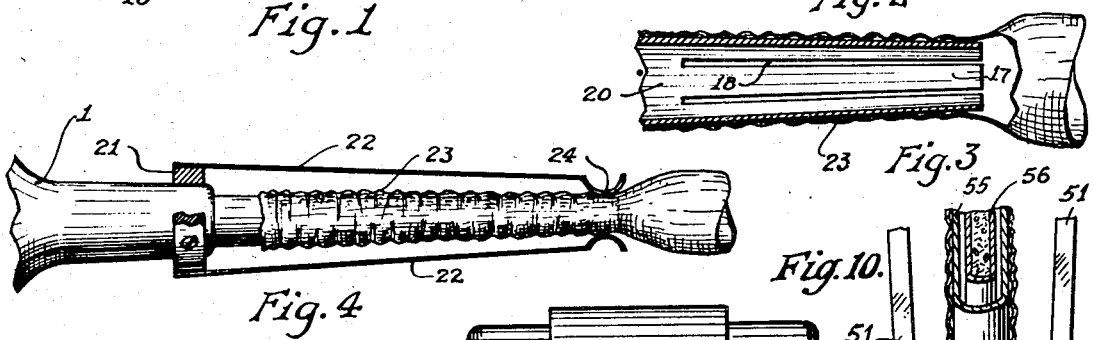
Fig.4
Fig.10.
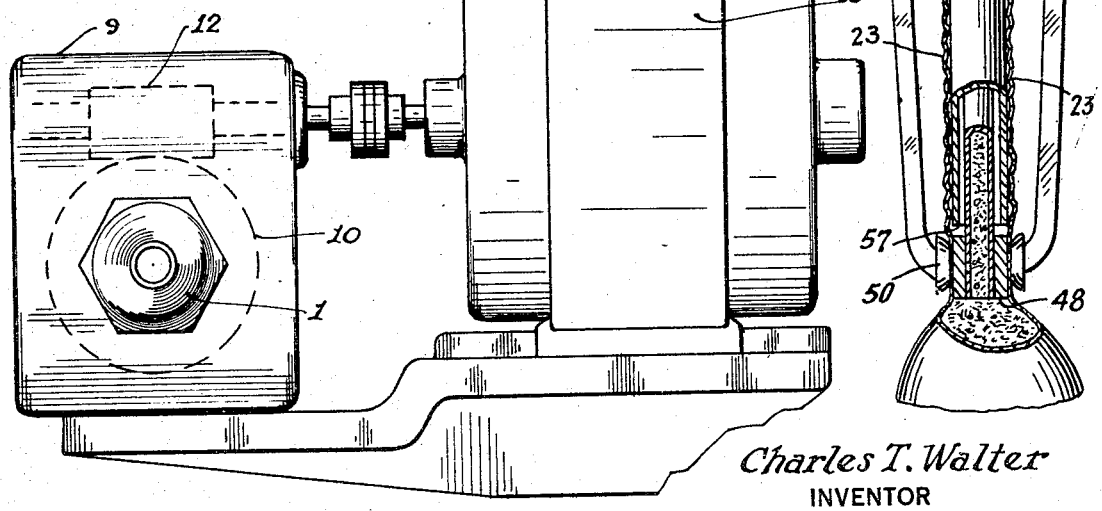
Fig.5
Charles T. Walter
INVENTOR
ATTEST-
Wm. C. Meiser
BY
ATTORNEY Aug. 8, 1939.  C. T. WALTER  2,168,693
SAUSAGE LINKER
Filed Feb. 10, 1937  2 Sheets-Sheet 2
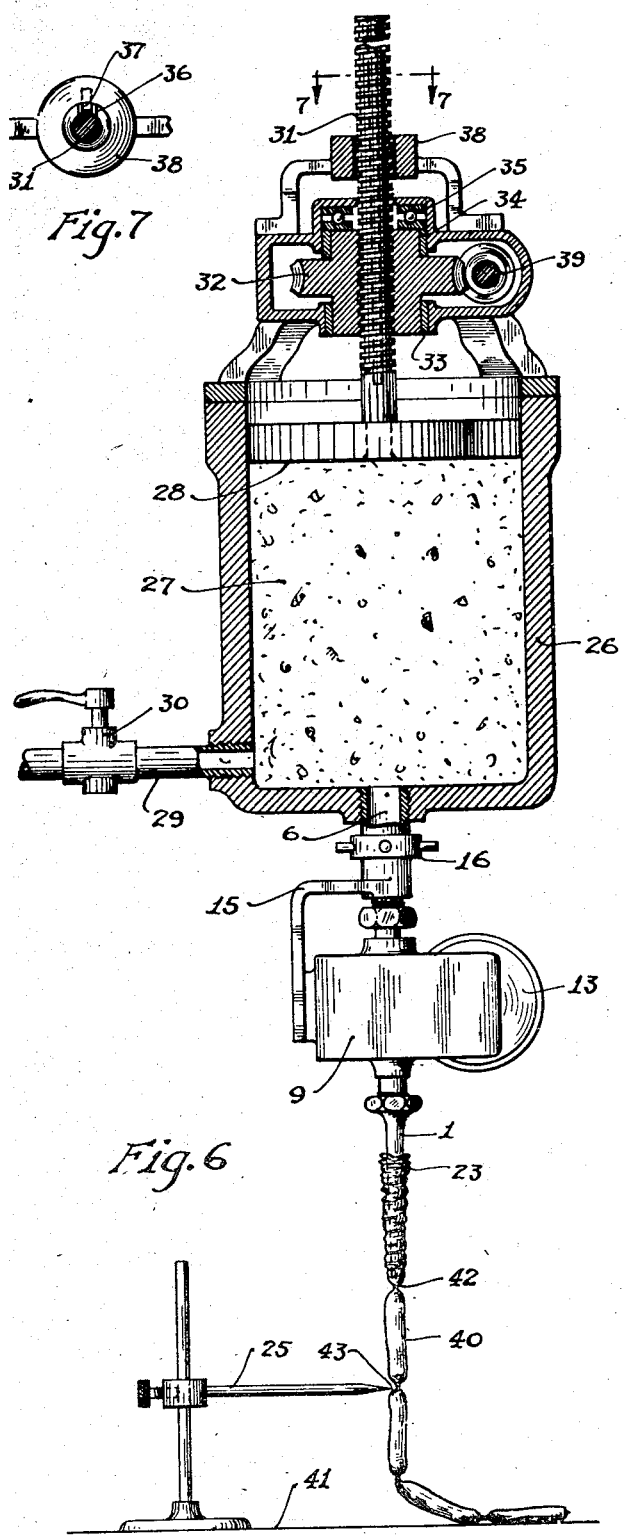
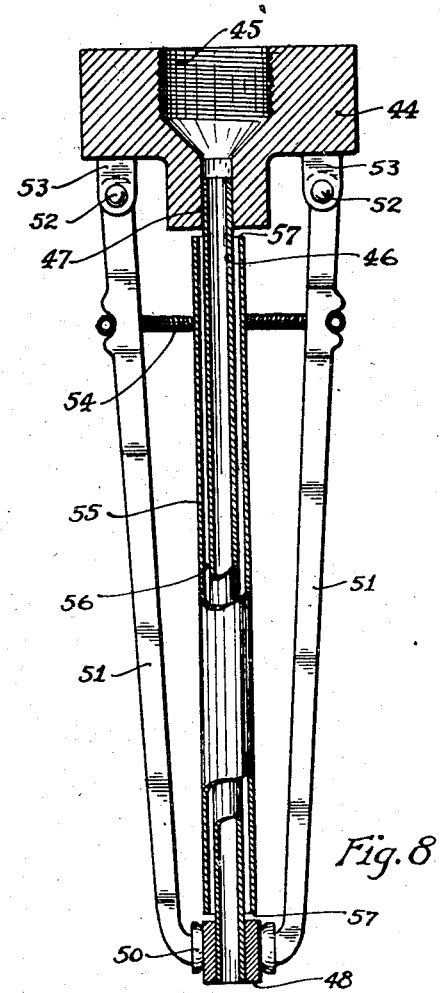
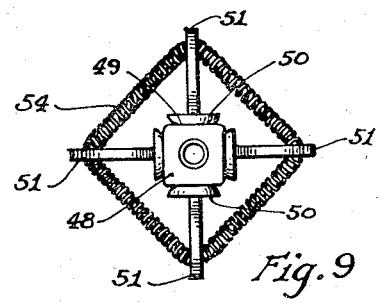
Charles T. Walter
INVENTOR
ATTEST:

Patented Aug. 8, 1939

2,168,693

UNITED STATES PATENT OFFICE 2,168,693

SAUSAGE LINKER

Charles T. Walter, Chicago, Ill., assignor to Industrial Patents Corporation, Chicago, Ill., a corporation of Delaware Application February 10, 1937, Serial No. 125,148

8 Claims. (Cl. 17—33)

One of the objects of the invention is to provide apparatus for use in stuffing and linking sausage.

Another object of the invention is to provide a sausage stuffing machine which functions as a semi-automatic sausage linker.

Another object of the invention is to provide a novel sausage stuffing nozzle adapted to provide resistance to the slippage of casing material passed from the nozzle in the stuffing operation.

Another object of the invention is to provide means in combination with a rotatable sausage stuffing nozzle to avoid breakage of casings.

Other objects of the invention will be apparent from the description and claims which follow.

In the drawings the similar reference characters in the several figures indicate similar parts.

Figure 1 is a cross sectional view of a rotatable sausage stuffing device.

Figure 2 is the detailed cross-sectional view of the end of one embodiment of a sausage stuffing nozzle for use with the apparatus of this invention.

Figure 3 is a detailed sectional view of one end of the nozzle shown in Figure 2 with the casing in the position it assumes during the stuffing operation.

Figure 4 is a detailed cross-sectional view of a nozzle for use with the apparatus of the present invention, employing an external type of holding device.

Figure 5 is an end view of the apparatus shown in Figure 1.

Figure 6 is a view partly in section of the apparatus of the present invention.

Figure 7 is a sectional view on the line 7—7 of Figure 6.

Figure 8 is a side view partly in section of a preferred embodiment of the nozzle of the present invention.

Figure 9 is a partial end view of the nozzle shown in Figure 8.

Figure 10 is a sectional view of one end of the nozzle shown in Figure 8 with the casing in the position it assumes during the stuffing operation.

In Figure 1, stuffing nozzle 1 is shown mounted as by threads 2 on rotating spindle 3 provided with passage 4 through its center communicating the passage 5 of nozzle 1 with sausage stuffer outlet 6. Spindle 3 is rotatably mounted in bearings 7 and 8 in housing 9. Spindle 3 may be rotatably driven by any suitable means as for example, worm wheel 10, firmly secured to the spindle at 11. Worm wheel 10 engages with worm 12, driven by motor 13. Spindle 3 extends through housing 9 into stuffing box 14 integral with bracket 15 supported by housing 9. Stuffing box 14 may be fastened to the stuffer outlet by any suitable device such as a threaded ring 16. The rotatable nozzle illustrated in Figure 1 may be attached to any convenient source of sausage meat. Figures 2 and 3 illustrate a stuffing nozzle which may be employed with the apparatus. The stuffing nozzle is shown in these figures as split into a number of segments 17 by narrow slots 18. The tension of sausage material forced through the stuffing horn causes the individual segments 17 to move outwardly from the center of the nozzle.

A cap 19 may be placed over the end of the expanding nozzle 20 to facilitate threading a casing on the nozzle. After the casing has been placed on the nozzle, the cap is removed. The expanding type of nozzle 20 provides a driving force between the surface of the nozzle and the casing to insure that the casing rotates with the nozzle during the stuffing operation. The nozzle shown in Figure 4, with a ring 21, carries flexible fingers 22 which may bear directly on the outside of the casing 23 as at 24.

In employing the apparatus shown in Figure 1, a suitable length of casing is placed upon nozzle 1 and motor 13 started. Sausage meat under pressure is admitted through outlet 6 to passage 4 and enters nozzle 1 through passage 5. If one end of the casing is closed over the end of the stuffing nozzle, a length of sausage will start to form. By reason of the rotation of the nozzle through the turning of worm gear 10 by worm 12, the length of forming sausage coming off the horn will rotate. When a suitable length of sausage has issued from the nozzle, the operator pinches the casing forming a link of sausage. The length of sausage which has been formed up to the point of pinching the casing will stop rotating. That portion of the length of sausage which is being formed will continue to rotate, resulting in the formation of one end of a link at the point of pinching.

A convenient gauge 25 as shown in Figure 6 may be arranged to aid the operator in determining the points at which to pinch the casing to obtain a series of links of the desired length. To secure the best results in a device of this type, it is necessary that the rate of discharge of sausage meat into the casing be uniform. Apparatus for carrying out this function is illustrated in Figure 6, wherein the outlet 6 communicates with stuffer cylinder 26 containing sausage meat 27. Piston 28 is adapted to slide within cylinder 26.

The sausage meat may be introduced under pressure to stuffer cylinder 26 through pipe 29, controlled by a stuffer valve 30. In ordinary operations the capacity of cylinder 26 is approximately fifty pounds of sausage meat. Piston 28 is carried by a threaded stem 31, the screw thread of which coacts with a mating thread in worm wheel 32. When worm wheel 32 is rotating in its bearings 33 and 34, rod 31 will move up or down depending upon the direction of rotation of the worm wheel. A ball-thrust bearing is provided at 35. The piston rod 31 is slotted as shown at 36. Slot 36 coacts with a sliding key 37 held in collar 38 to prevent rod 31 turning with the motion of worm wheel 32. Worm wheel 32 is turned by worm 39 driven by any suitable source of power, as for example, a reversible electric motor which may be used to raise or lower the piston 28. With the apparatus depicted in Figure 6, the speed at which the piston travels downwardly during the working stroke will be substantially constant, resulting in a constant rate of speed of formation of each sausage link 40.

For convenience the mechanism may be mounted in a vertical position on a table top 41 on which is also placed the gauge 25. The operation of the device will be understood by reference to Figure 6. Assuming that chamber 26 is empty, the operator opens valve 30 which will communicate chamber 26 with a sausage meat reservoir as shown. The driving motor operating worm 39 is set to draw piston 28 away from the closed end of the cylinder 26. As the piston moves, the space beneath becomes filled with sausage meat entering from pipe 29. When the piston has reached the upper end of its travel, the driving motor may be stopped and valve 30 closed. A sausage casing 23 may then be placed on stuffing nozzle 1 and motor 13 started. Simultaneously, the driving motor worm 39 is started to cause piston 28 to be driven downwardly. The operator now pinches the end of the casing a short distance from the end of the nozzle as at 42. Sausage meat issuing from nozzle 1 at a uniform rate will form lengths such as link 40. As each neck 42 passes gauge point 43, the operator again pinches the casing at 42, starting a new link.

The speed relation between rotating nozzle 1 and the rate of extrusion of the sausage meat should be such as to give from two to three twists of the casing between each link.

It will be appreciated that an apparatus such as shown in Figure 6 may be constructed compactly such that a number of such devices may be fed from a single sausage meat reservoir.

A preferred novel form of rotatable nozzle is shown in Figures 8 and 9. Flange 44 is adapted to be screwed to a continuously or intermittently rotating element through which sausage meat may be forced at a predetermined uniform rate. Flange 44 may be attached to rotatable spindle 3, as by threads 45.

Thin-walled tube 46 is rigidly affixed to flange 44 at 47 and rotates therewith. Tube 46 is provided at its free end with nose 48 which is rigidly affixed thereon, and which may be, as is shown more clearly in Figure 9, an enlargement having a square profile having flat surfaces 49. Bearing on each of the flat surfaces 49 is a flat shoe 50 carried on one end of a lever 51 pivoted at 52 to lugs 53 integral with flange 44. The entire group of rotary levers 51 is loaded by spring 54 which keeps a substantially uniform tension on all the levers in the system. The application of pressure on surfaces 49 causes the sausage casing 23 to turn with the nozzle and offers resistance to the paying off of the casing from the nozzle, thus aiding in maintaining a tightly stuffed condition in the finished sausage.

Since every casing is slipped over tube 46 and paid off of the nozzle against the frictional engagement between the shoes 50 and their mating surfaces 49, under the influence of the pressure of meat within the casing, some rotational slippage takes place between the casing and the rotating members 49 and 50.

It will be seen that for each full revolution of the mechanical elements, the portion of casing adjacent the free end of the nozzle turns something less than a full revolution by reason of the rotational slippage which has been described. The slippage effect may soon accumulate to a point at which the casing becomes tightly wrapped or twisted around the rotating tube 46. This torsional wrapping has the effect of firmly binding a short length of the casing firmly to the tube 46. If the casing becomes thus bound to the tube, it cannot be readily pulled off the nozzle by pressure within the casing, resulting in breakage of the casing. To avoid this possibility, a thin-walled metal tube 55 is placed over tube 46. Sufficient clearance 56 is provided between the two tubes to enable tube 55 to rotate freely about tube 46. A small amount of end clearance 57 is also provided. When the casing is threaded on the nozzle, it rests upon tube 55 which turns with the entire mass of the casing and is free to assume any differential movement which may be necessary between the rotation of the nozzle elements 49 and 50 and the mass of the casing upon the nozzle.

This differential arrangement entirely eliminates torsional binding of the casing on the nozzle as it is being paid off and permits relatively high speed rotation of the nozzle without danger of casing breakage.

I claim:

1. A sausage stuffing nozzle comprising a rotatable tube, a plurality of flat bearing surfaces extended circumferentially of the tube and adjacent the discharge end of said tube and means cooperative with each of said bearing surfaces for establishing frictional resistance between a casing and the bearing surfaces during the stuffing operation.

2. A sausage stuffing nozzle comprising a rotatable tube, a plurality of flat bearing surfaces extended circumferentially of the tube and adjacent the discharge end of said tube and means cooperative with each of said bearing surfaces for establishing frictional resistance between a casing and the bearing surfaces during the stuffing operation, said means comprising shoes carried by levers.

3. A sausage stuffing nozzle comprising a rotatable tube, a plurality of flat bearing surfaces extended circumferentially of the tube and adjacent the discharge end of said tube and means cooperative with each of said bearing surfaces for establishing frictional resistance between a casing and the bearing surfaces during the stuffing operation, said means comprising shoes carried by levers and means for maintaining a substantially uniform tension on the levers.

4. A rotatable sausage stuffing nozzle comprising a tube, frictional surfaces adjacent the discharge end of said tube, means for maintaining a casing in a state of frictional resistance to said surfaces during the stuffing operation and a freely rotatable sleeve mounted on said stuffing tube to carry the casing reserve on the nozzle and to assume a differential movement between the rotation of the nozzle elements and the casing.

5. In a sausage stuffer, a rotatable stuffing tube and a freely rotatable sleeve mounted thereon.

6. In a sausage stuffer comprising a stuffing tube, bearing surfaces at the discharge end of the tube, means for holding the casing in frictional engagement with said bearing surfaces while passing thereover, and a rotatable casing bearing sleeve mounted upon said tube.

7. A sausage stuffer comprising a stuffing tube, means for holding a casing in frictional engagement at a point near the discharge end of the tube and a freely rotatable sleeve mounted on said stuffing tube.

8. In a sausage stuffing device a rotatable spindle carrying a fixed stuffing tube, bearing surfaces at the discharge end of the tube, a freely rotatable sleeve mounted upon said tube intermediate the ends thereof, and means cooperating with said bearing surfaces for providing frictional resistance to the passage of a casing over said bearing surfaces.

CHARLES T. WALTER.